March 21, 1961     J. CHODACKI ET AL     2,975,977
TRACTION DEVICE FOR AUTOMOBILE TIRES
Filed March 20, 1959
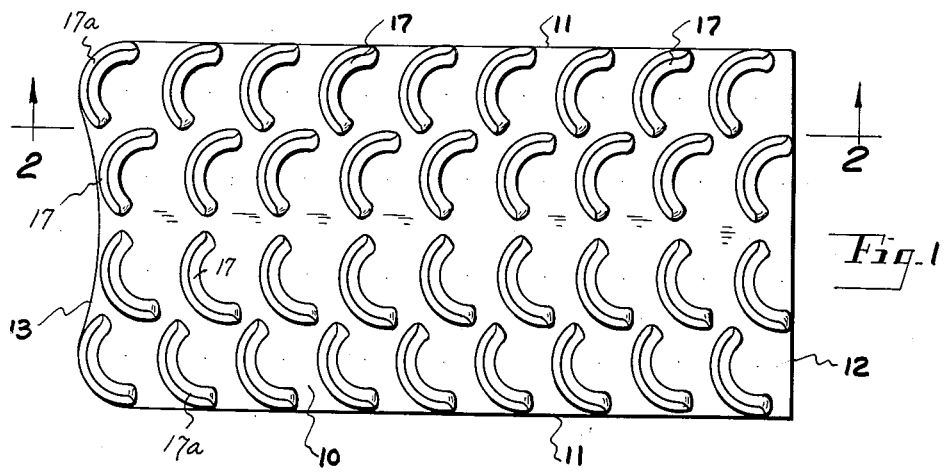
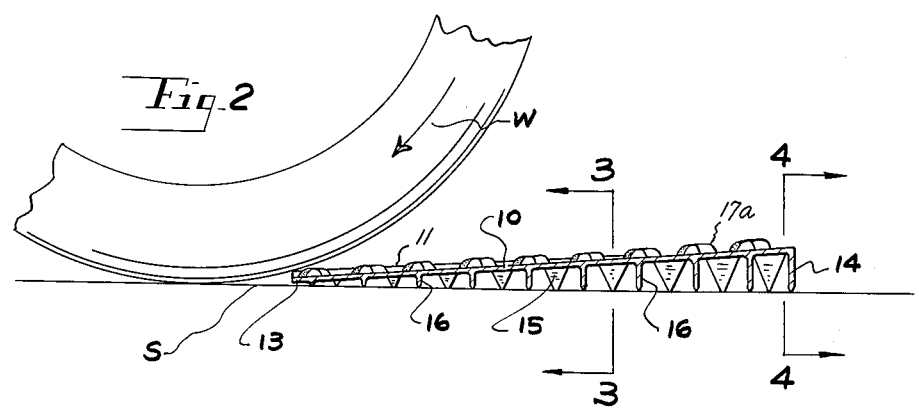
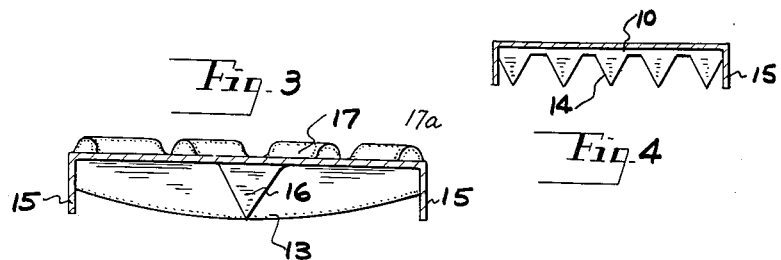
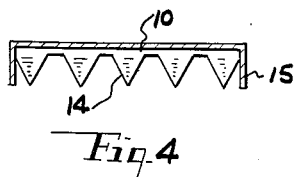
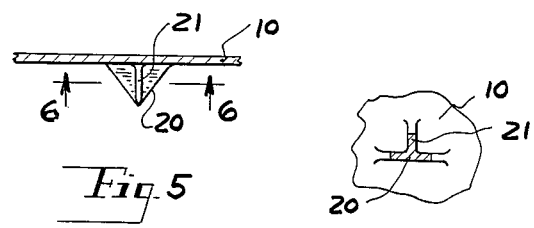
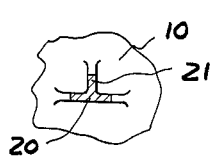
INVENTOR.
JOSEPH CHODACKI
ROMAN ZdzojKOWSKI
BY
*Louis Chayka*
ATTORNEY

United States Patent Office 2,975,977
Patented Mar. 21, 1961

2,975,977
TRACTION DEVICE FOR AUTOMOBILE TIRES

Joseph Chodacki, 12504 Charest, and Roman Zdrojkowski, 3889 Sobieski, both of Detroit 12, Mich.

Filed Mar. 20, 1959, Ser. No. 800,811

1 Claim. (Cl. 238—14)

The invention pertains to means adapted to be wedged under the tire of an automobile in the path of the rotating wheel equipped with said tire. This is to be done in cases where the ground is slippery by reason of ice or mud and the tire cannot secure a gripping contact with the surface on which it rests.

While a number of devices for the same purpose have already been made, the object of the invention is to provide a superior product which will have the following qualities: (1) it will be small and light in weight; (2) it will be easily portable; (3) it will have a number of grippers on its upper surface and a number of spikes on its underside; (4) it will form a gentle incline; and (5) it will form a channel-like track to prevent the tire from swerving the device sideways.

We shall now describe our improvement with reference to the accompanying drawings in which:

Fig. 1 is a top elevational view of the tire traction device;

Fig. 2 is a longitudinal sectional view of the device on line 2—2 of Fig. 1;

Fig. 3 is a sectional view on line 3—3 of Fig. 2;

Fig. 4 is an end view of the device on line 4—4 of Fig. 2;

Fig. 5 is a fragment of a track-forming plate with a spike of a modified shape;

Fig. 6 is a sectional view on line 6—6 of Fig. 5.

Similar numerals refer to similar parts throughout the several views.

The device, as a whole, has the form of an inclined track or ramp which for best service ought to be made of metal, as by die casting, even though a suitable product could also be made out of stout sheet stock.

The device includes a top plate 10 defined by two parallel sides 11, and is defined, in part, by a front edge 13 which is adapted to rest directly on the ground, while the back end portion 12 of said plate forms the raised end of the said incline. This result has been obtained by a plurality of teeth 14 which are all of the same length and which extend downwardly from the end portion 12 of the incline.

Integrally formed with the top plate, on each side thereof, are a plurality of downwardly-turned teeth 15. However, these are short at the front end of the incline but increase in length progressively in the direction of the back portion of the ramp till the last tooth in the row, at the back portion 12, is or may be of the same length as the teeth 14. In addition thereto, there are a number of teeth 16 on the underside of the incline. These teeth are arranged in a single row along a line intermediate the sides 11 of the incline, and are graduated in length to correspond to the similarly-graduated teeth along the sides 11. The only side of the incline which is devoid of teeth is at the front.

The front edge 13 of the plate is recessed, said edge defining an inwardly-bent curve, as shown in Fig. 1. In addition, the track, beginning at its front portion, is shaped into a shallow arcuate trough, which feature is shown in Fig. 3.

In order to provide means for a frictional contact with the top plate 10, its upper surface includes a plurality of arcuate ridges 17 and 17a, respectively, said ridges being disposed substantially transversely to the length of the track. These ridges are arranged in four rows spaced from each other and extending in parallel relation to the sides of the plate 10. Two of the rows are located on each side of the longitudinal median line of the plate 10. It will be noted that the first ridges in the respective rows, at the front end of the plate, are located at the very edge 13 of the plate 10. Another detail which has to be pointed out is that the individual ridges 17a in the outer rows are in a laterally-staggered relation to the individual ridges 17 in the rows adjoining said median line.

When the track is to be used to provide a frictional support for a wheel of an automobile, the low end of the track, as defined by said edge 13, is to be shoved against the tire lengthwise from the direction where the tire, to meet said track, would be rotating clockwise. This is shown in Fig. 2 in which the direction of the rotation of the wheel "W" is shown by an arrow. In the course of rotation, the tire would encounter the grippers and shift the track lengthwise till the axis of the wheel would be directly above the ramp, in which case the weight of the automobile would force the teeth of the ramp into the underlying ice or ground. This would bring the top plate 10 to a level position, while the ridges 17 would provide sufficient frictional contact with the tire to permit the tire to roll off the track over the back portion 13 of the incline to new ground surface, and to supply sufficient momentum for continuation of the movement of the automobile.

An important result is herein achieved by reason of the trough-like shape of the track and the specific arrangement of the ridges in four rows and the staggered positions of the individual ridges in the outer rows with respect to the ridges in the inner rows. Both of these features have proved helpful in preventing the track from swerving at an angle to the path of the tire in the course of the forward movement of the automobile supported, in part, by said tire. This swerving is prevented by reason of the fact that the sides of the track are higher than the bottom portion of the trough-like formation of the plate 10, and also because any tendency of the track to swerve from the line of said path would be immediately checked and corrected by increased frictional contact with the outer ridges along one side of the track, while the frictional contact with the ridges along the other side would be lessened.

After having described our invention, we wish to claim the following:

A traction device for an automobile tire, the device consisting of an oblong plate defined by two parallel sides and having a front end and a rear end, said plate having along each side a downwardly turned flange formed into a plurality of integrally-formed teeth of gradually-increasing length beginning with the shortest teeth at the front end to the longest teeth at the rear end, said teeth lying in a single plane, said plate having along its rear end a downwardly turned flange formed into a plurality of teeth extending downwardly from the rear end of the plate and lying in a plane at right angles to the planes of the side teeth, and a plurality of longitudinally spaced teeth extending from the undersurface of the plate in a row along a line centrally spaced from both sides of the plate, the teeth being graduated in length from the shortest at the front end of the plate to the longest at the rear end thereof, said latter teeth being parallel to each other and in planes parallel to the plane of the rear end teeth, the plate as supported by said teeth forming an incline, the front end portion of the plate being shaped into a shallow arcuate trough, and adapted to be wedged against the tire at the ground level, with the main body of the plate extending forwardly of the tire in the path of its intended travel, and a plurality of transversely arranged arcuate ridges integrally formed from and projecting above said plate for engagement with the tire tread, the ridges being aligned in longitudinal rows on each side of a longitudinal median of the plate, individual ridges being spaced from each other longitudinally and laterally.

References Cited in the file of this patent

UNITED STATES PATENTS

| | | |
|---|---|---|
| 1,344,238 | Lavallee | June 22, 1920 |
| 1,373,042 | Workman | Mar. 29, 1921 |
| 1,380,574 | Mason | June 7, 1921 |
| 1,400,478 | Deschamps | Dec. 13, 1921 |
| 1,815,435 | Harding et al. | July 21, 1931 |
| 2,422,006 | Friedman | June 10, 1947 |
| 2,479,760 | Merrick | Aug. 23, 1949 |
| 2,496,119 | Cesen | Jan. 31, 1950 |
| 2,553,216 | Simmons | May 15, 1951 |
| 2,577,890 | Hardy | Dec. 11, 1951 |
| 2,619,289 | Plante | Nov. 25, 1952 |

FOREIGN PATENTS

| | | |
|---|---|---|
| 198,146 | Austria | June 10, 1958 |